(No Model.)  6 Sheets—Sheet 2.
T. B. FARRINGTON.
DRIER.
No. 289,635.  Patented Dec. 4, 1883.
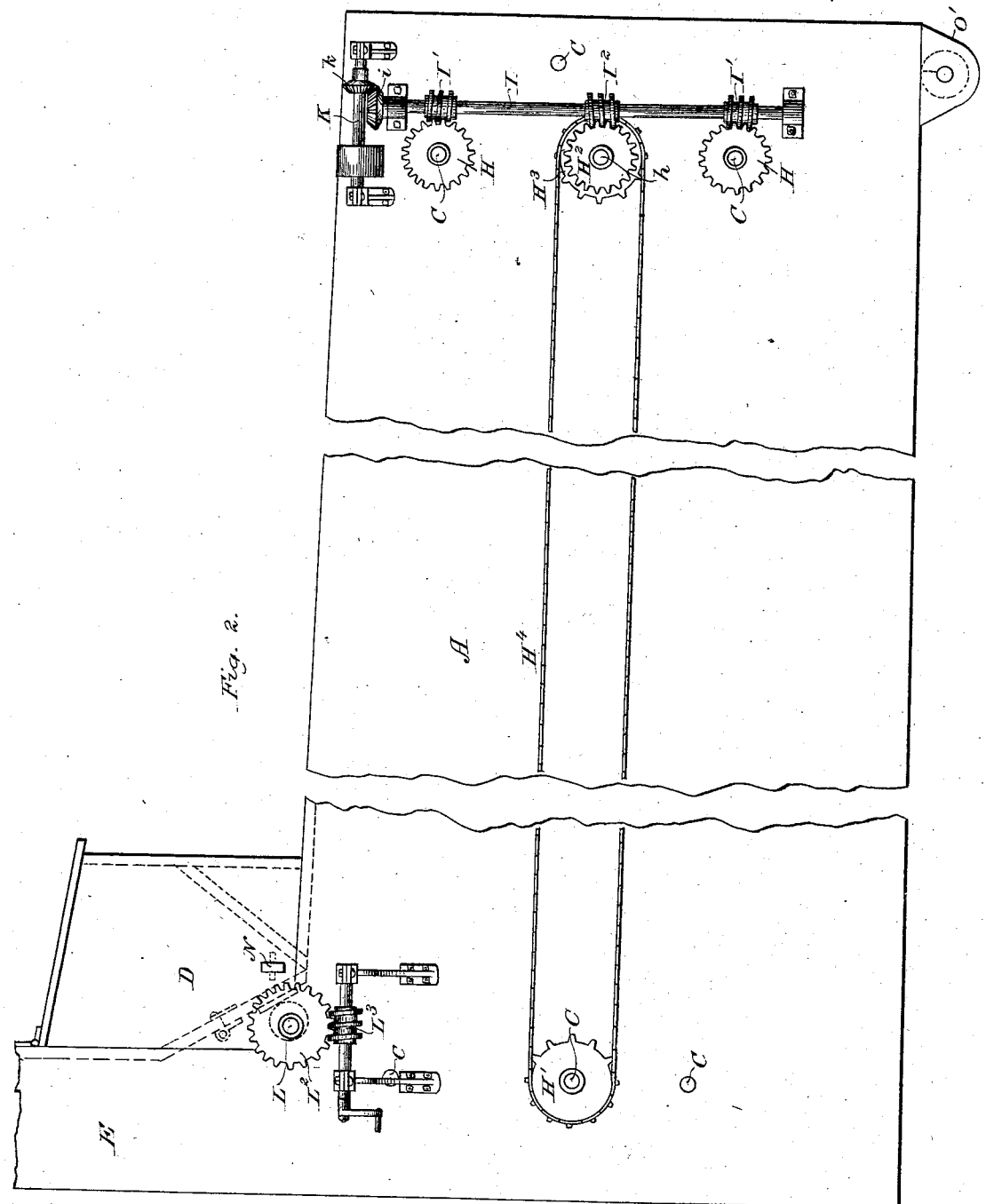
Witnesses:
Jno. W. Stockett.
C. C. Poole
Inventor:
Thomas B. Farrington
per M. E. Dayton
Attorney
N. PETERS, Photo-Lithographer, Washington, D. C.

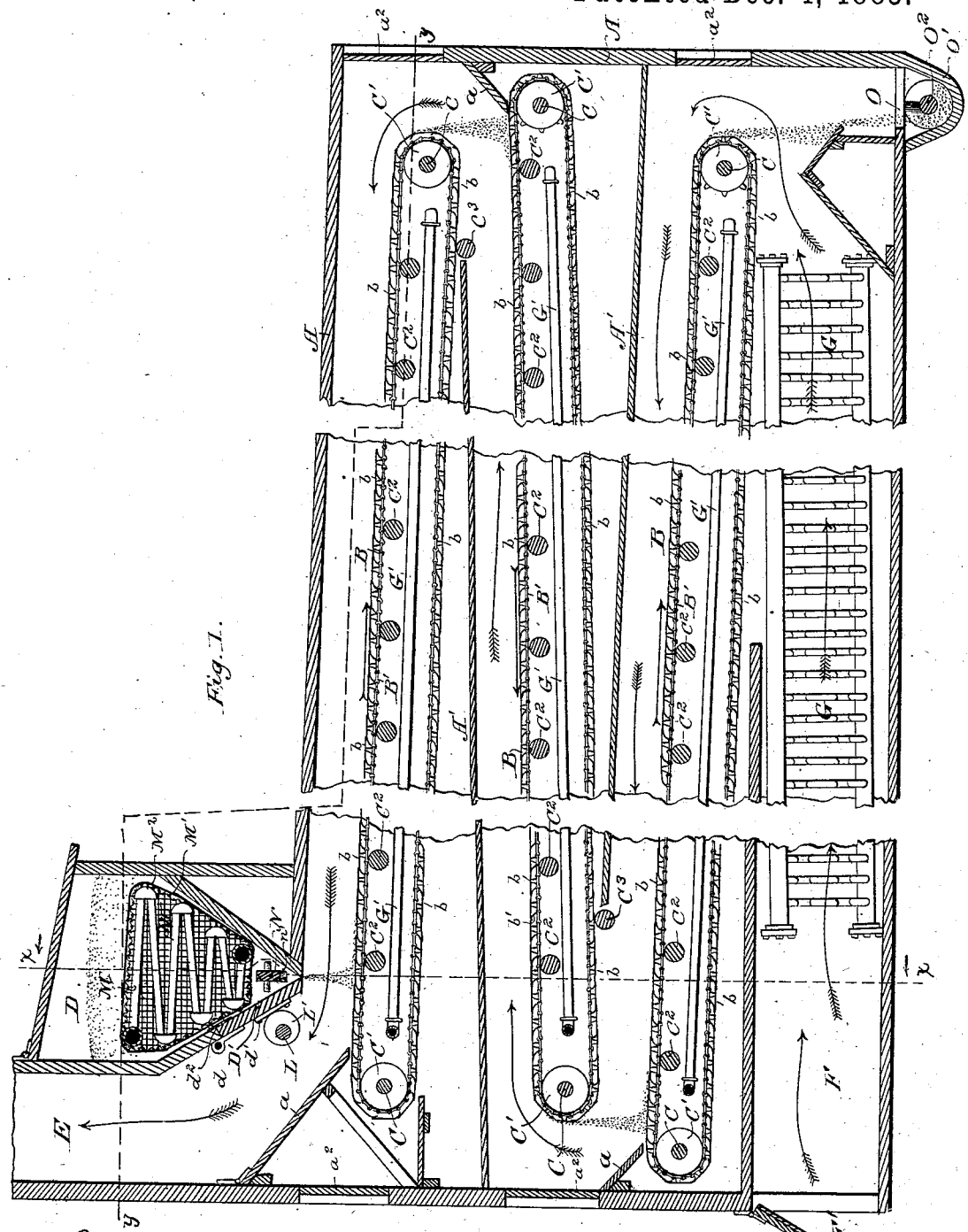

(No Model.) 6 Sheets—Sheet 3.
T. B. FARRINGTON.
DRIER.
No. 289,635. Patented Dec. 4, 1883.
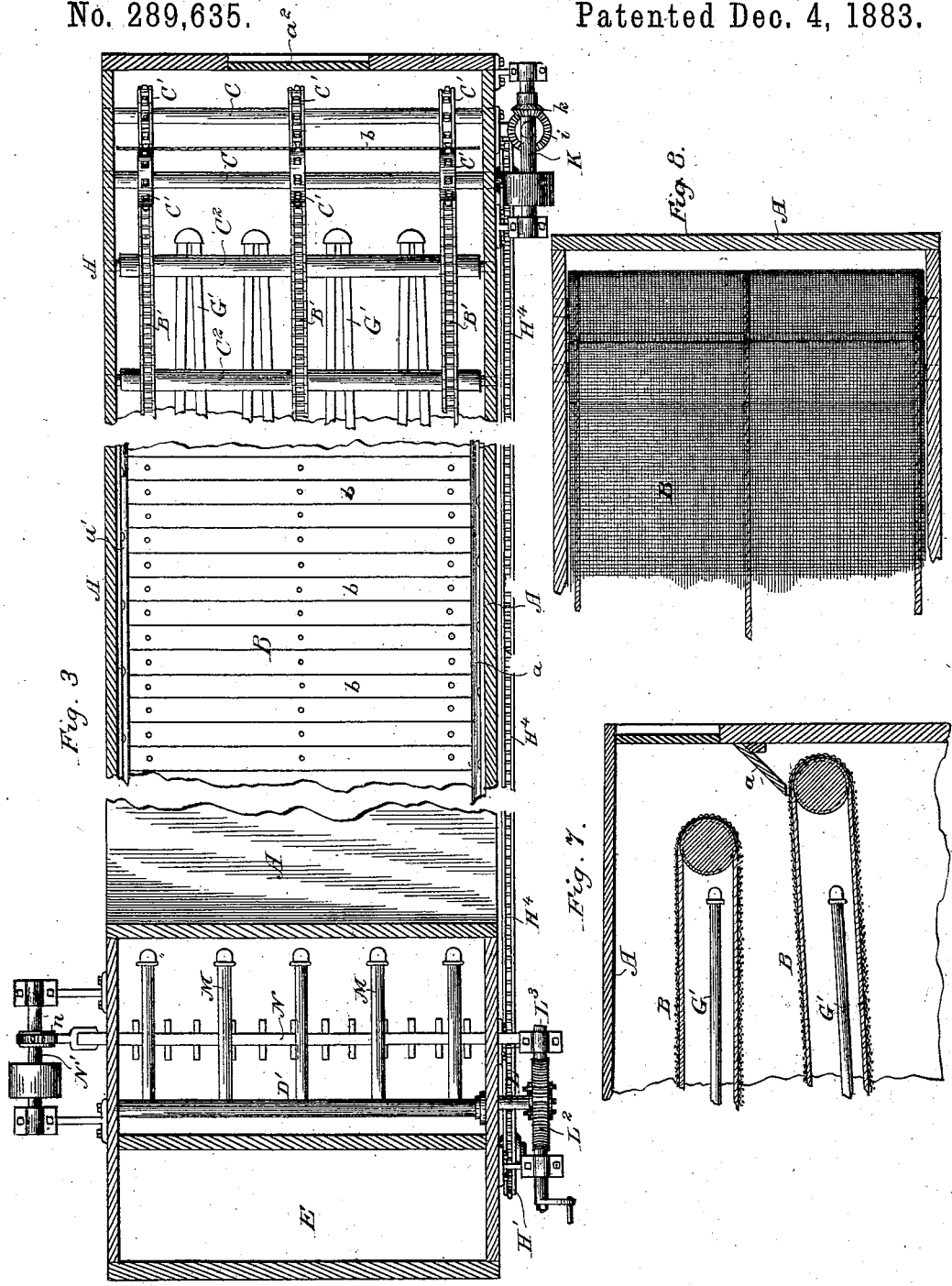
Witnesses.
Jno. W. Stockett,
C. C. Poole.
Inventor:
Thomas B. Farrington
per M. E. Dayton
Attorney (No Model.) 6 Sheets—Sheet 4.
T. B. FARRINGTON.
DRIER.
No. 289,635. Patented Dec. 4, 1883.
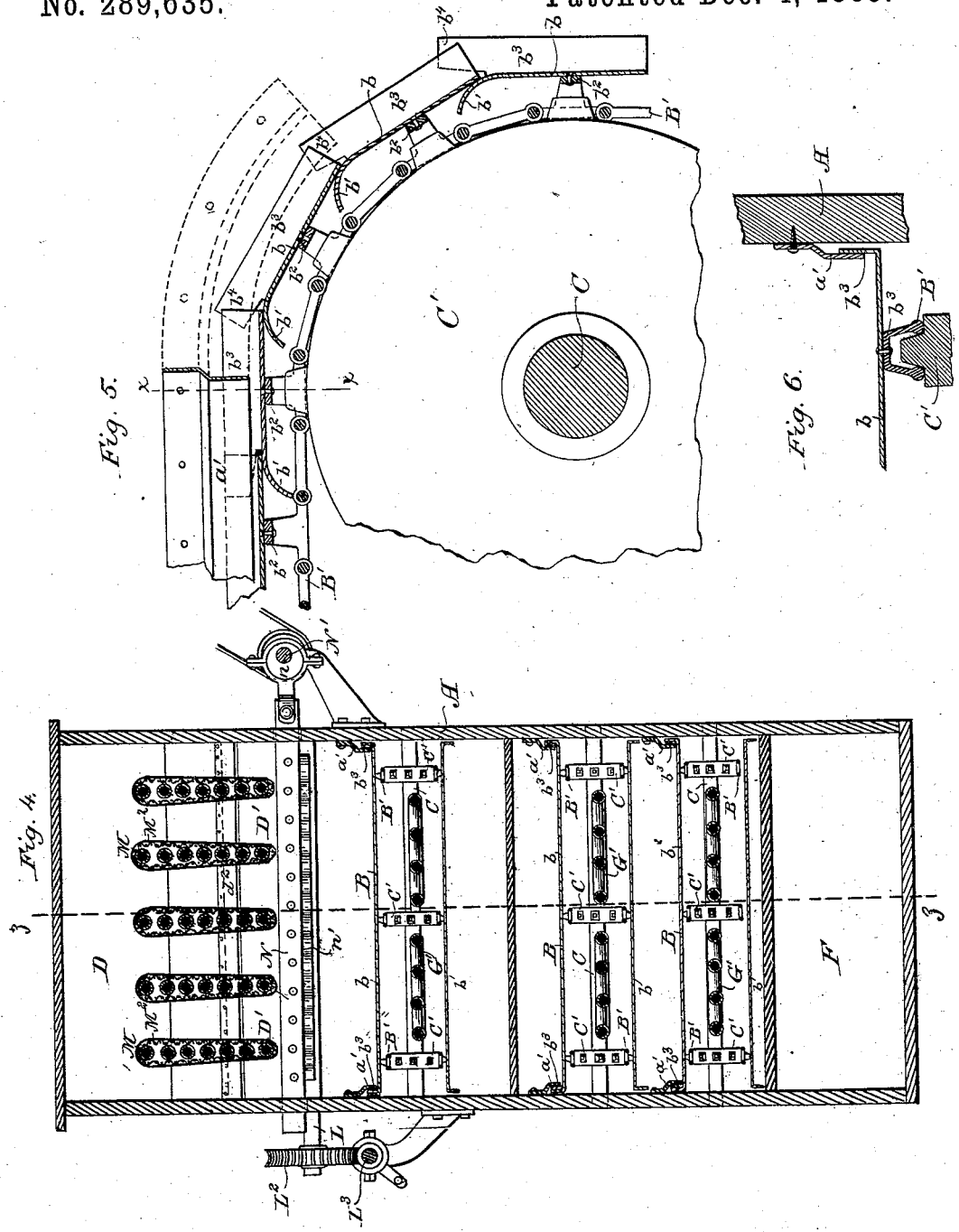
Witnesses:
Jno W. Sockett
C. C. Poole
Inventor
Thomas B. Farrington
per M. E. Dayton
Attorney (No Model.) 6 Sheets—Sheet 5.
T. B. FARRINGTON.
DRIER.
No. 289,635. Patented Dec. 4, 1883.
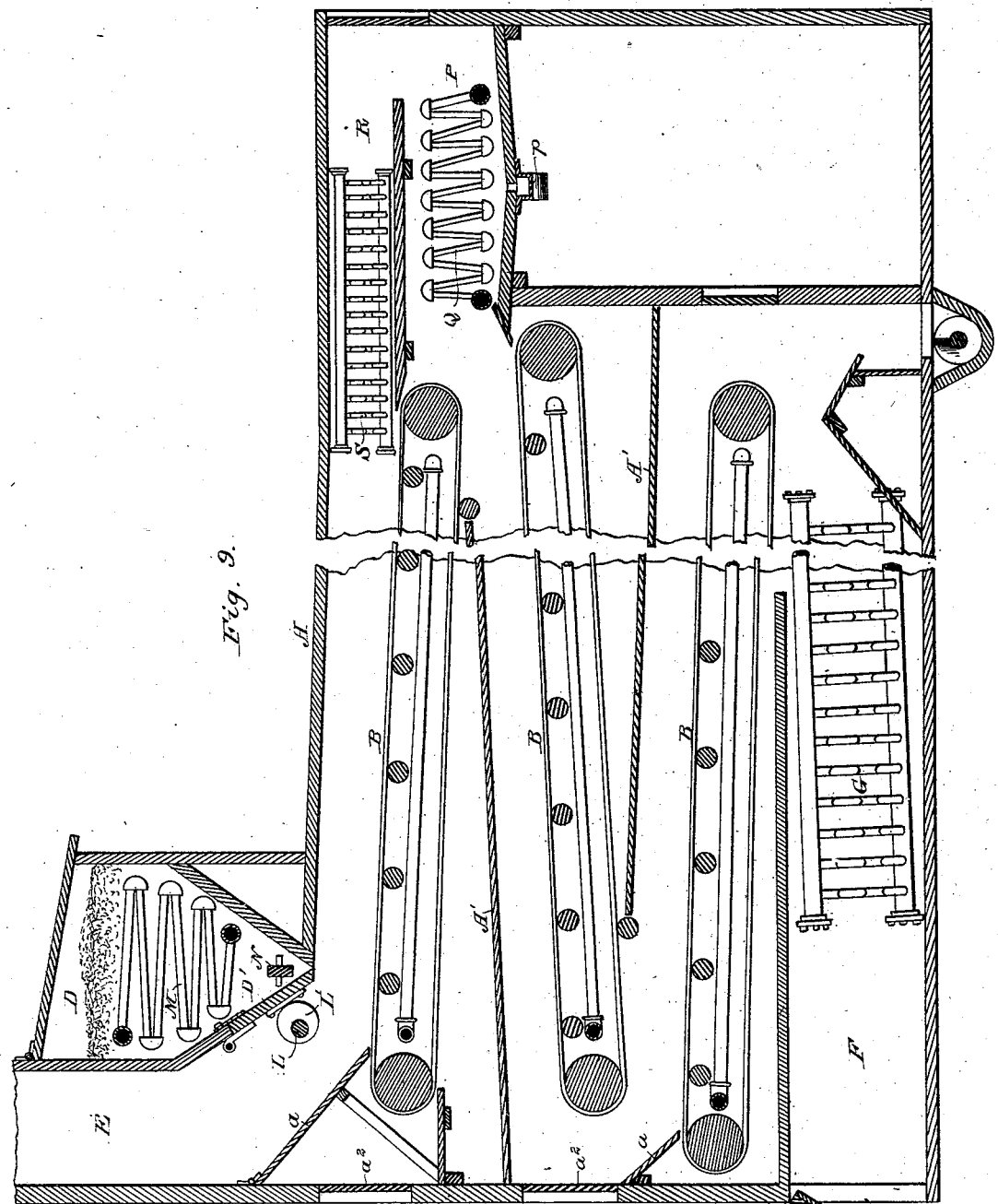
Witnesses
Jno. W. Stockett,
C. C. Poole
Inventor
Thomas B. Farrington
per M. E. Dayton
Attorney (No Model.) 6 Sheets—Sheet 6.
T. B. FARRINGTON.
DRIER.
No. 289,635. Patented Dec. 4, 1883.
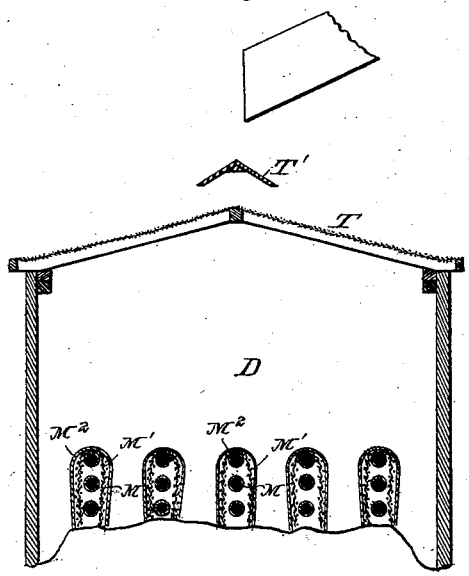
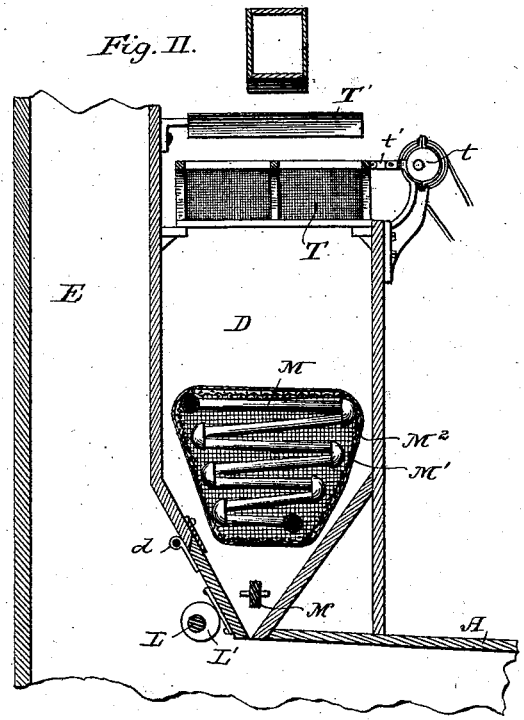
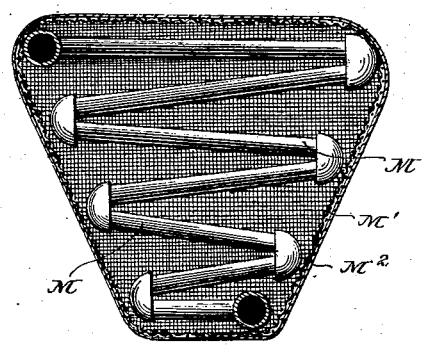
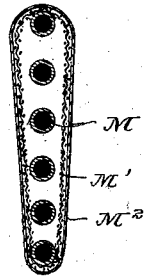
Witnesses:
Jno. W. Stockett
C. C. Poole
Inventor,
Thomas B. Farrington
per W. E. Dayton
Attorney

UNITED STATES PATENT OFFICE.

THOMAS B. FARRINGTON, OF MINNEAPOLIS, MINNESOTA.

DRIER.

SPECIFICATION forming part of Letters Patent No. 289,635, dated December 4, 1883.

Application filed July 9, 1883. (No model.)

*To all whom it may concern:*

Be it known that I, THOMAS B. FARRINGTON, of Minneapolis, in the county of Hennepin and State of Minnesota, have invented certain new and useful Improvements in Driers; and I do hereby declare that the following is a full, clear, and exact description thereof, reference being had to the accompanying drawings, and to the letters of reference marked thereon, which form a part of this specification.

This invention relates to devices for drying grain, fruit, sawdust, or other materials. Its object is to provide an improved construction in such devices; and it consists in the matters hereinafter described, and pointed out in the claims.

The essential features of a machine embodying my invention are as follows: A series of endless-belt carriers or traveling tables are arranged, one above another, in a suitable housing, each of said tables being constructed to deliver the material carried over its end to the end of the one below it. The alternate tables of the series are moved in opposite directions, so that the material placed upon the top table will be conveyed downward and over all the tables until discharged at the bottom of the machine, a current of heated or dry air being caused to pass over the surface of the material upon the several tables during such movement, either by a natural draft or other means. The belt-carriers or tables mentioned are preferably arranged in a slightly-inclined position, inclined partitions being placed over each carrier, parallel with the surface thereof, in order to form a parallel passage for the air in its ascent, and to keep it in proximity to the material upon the surface of the tables. A suitable feeding-hopper is placed at the head of the first table, which is provided with a device for controlling the supply of material to the drier, and with a coil for heating the material placed therein, and a suitable agitating device is also preferably placed over the exit-opening of said hopper, in order to insure an even and continuous flow of material therefrom.

In the accompanying drawings, Figure 1 is a central longitudinal section of a drier embodying my invention, said section being taken upon the line $z\ z$ of Fig. 4. Fig. 2 is a side elevation of the same. Fig. 3 is a horizontal section taken upon line $y\ y$ of Fig. 1. Fig. 4 is a vertical cross-section taken upon the line $x\ x$ of Fig. 1. Figs. 5 and 6 are detail views, showing the construction of the endless-belt carriers. Fig. 7 is a detail section, showing a modified form of the belt-carriers, in which they are constructed of wire-cloth. Fig. 8 is a sectional plan view of the same. Fig. 9 is a longitudinal vertical section of the drier, showing a modified form thereof. Figs. 10 and 11 are detail views, showing a sieve over the feed-hopper. Figs. 12 and 13 are detail views of the heating-coils in the feed-hopper.

A is the outside casing or housing of a drier, and B are a series of endless-belt carriers or tables placed therein, one above another, preferably in a slightly-inclined position. The said tables consist, as shown, of narrow transverse strips $b$, of metal, attached to endless-chain belts B', which pass around sprocket-wheels C', mounted upon shafts C, having bearings at either end in the side walls of the housing A. The said shafts are rotated by suitable gearing, so as to move the carriage B in alternate directions, as will be hereinafter described.

As shown in the accompanying drawings, there are three of the endless carriers or tables B, and the intermediate table is driven in a direction opposite to the direction of motion of the other two, so that material delivered to the top table at one end of the machine will be carried to the other end thereof and fall upon the oppositely-moving table below it, by which it will be conveyed back and delivered to the lower table, upon which it will again traverse the length of the housing, and from which it will be delivered to an exit-opening or a suitable receptacle. When more than three tables are employed, the alternate tables are moved in opposite directions, and each is arranged to deliver to the one below it, so that material fed to the top carrier will be carried back and forth by the several carriers, and finally discharged at the bottom of the machine in the manner before described. Material is fed to the upper table from a hopper, D, which is placed at the top of the drier, at one end thereof, and is provided with a narrow exit-opening at its bottom extending the full width of the machine, through which opening the material to be dried is fed in a thin stream to the top table. By this means the said material is spread evenly in a thin layer over the said table, and is delivered in the same manner to the next succeeding one, so that each table, when moving, will be covered with a thin and evenly-distributed layer of the material to be dried. The housing A is connected at its top with a flue, E, as shown, and in a chamber, F, at the bottom thereof, is placed a series of steam-coils, G, for heating the air in said chamber, and thereby causing an upward current of air through the said housing and out through the flue E. The sprocket-wheel shafts C, at one end of each of the carrier-belts or tables, are placed at some distance from the end wall of the housing, and at the other end of the tables close to the end wall, so as to allow the passage of air around one end only of each of said belts, the space between the belts and the end wall being arranged at the opposite ends of the alternate belts, so that the heated air, in passing up through the chamber of the drier, will be caused to take a zigzag course, and will pass longitudinally through the spaces between the top surface of one carrier-belt or table and the lower surface of the returning portion of the table above it. The ascending current of air is thus caused to pass over all of the material exposed upon the surface of the carriers or tables, and the drying effect of the air upon the material is increased by the passage of the material through the air-current as said material falls from the end of one table to the table below it, and also from the mixing of the material occasioned by its passing from one table to the other. An inclined board, $a$, is preferably attached to the end walls of the housing at one end of each of the carrier-belts or tables, the lower edge of which board overhangs the upper surface of said table, and as close to such surface as is practicable, in order to more effectually prevent the passage of air around said end. Said board $a$ also serves to deflect the material falling from the end of the table above inwardly and upon the surface of the table over which it is placed, as shown in the drawings.

In order to facilitate the upward passage of air through the drier, the carriers B may be inclined slightly, as shown, the alternate carriers being arranged to slope in opposite directions in such a manner that the material thereon will travel in a direction from the top to the bottom of the inclines. By inclining the carriers in the manner stated the material upon the surface thereof tends by its gravity to aid in moving the carriers, and thereby renders less power necessary for the purpose.

When the tables are oppositely inclined, as above described, the spaces between them will not be parallel, and in order to make a uniform passage for the air-current, and to retain it in close proximity to the material upon the surface of the tables, inclined partitions A' are placed in the chamber of the drier, a short distance above and parallel to the top surface of each belt-carrier or table. The said partitions are placed in the drying-chamber, so as to extend from side to side thereof, and from the end wall of said chamber to a point near the lower end of each of the said tables, and beneath the same, as shown.

As an improved means of construction in the tables B, the strips $b$, composing said tables, as shown in the detail sectional views, Figs. 5 and 6, are provided upon their rear edges with downwardly-curved portions or flanges $b'$, which serve to stiffen said strips, so as to keep them from bending under the weight of the material thereon in their unsupported portions, and also to facilitate the passage of said strips around the sprocket-wheels or pulleys C'. The said flanges are curved for the latter purpose in such manner that when the strips are inclined at an angle with each other as they pass over said wheels the front edges of each plate will rest and slide upon the surface of the curved flange of the adjacent one, so as to form close joints between the strips and to maintain a continuous surface in the tables during their passage around the said wheels. The material upon the tables is, by the construction described, prevented from escaping between the strips $b$, and said strips being arranged with their front edges overlapping the rear curved edges of the adjacent ones, the material falling therefrom as they pass over the sprocket-wheels tends to slide over the said joints, and not to enter them. The strips $b$ are preferably attached to the chain-belts B' by means of elevated cross-bars or bridges $b^2$, formed upon the alternate links, to which said cross-bars the said strips are riveted. The object of the raised cross-bars $b^2$ is to support the strips $b$ above the chain-belts, so as to give room above the belts for the flanges $b'$, and also to permit the engagement of the sprockets upon the wheels C' with the links, as shown in Figs. 5 and 6.

Strips provided with flanges, as described, may be used with flat or other belts, and when so used may be attached to studs or projections upon said belts, or to single central projections upon the links of a chain-belt, instead of to the cross-bars $b$ described. The lengths of the links and the width of the strips may be varied and a strip attached to every link or to every third or other link, as is desired, the operation of the strips with reference to each other being the same in either case. The flanges $b'$ are preferably constructed so that their lower edges rest upon the chain-belts, as shown, and the strips $b$ are thereby additionally supported, and any tilting motion tending to open the joint between two adjacent strips thereby prevented.

In order to prevent the material upon the tables from passing through the joints between the said tables and the side walls of the housing, the ends $b^3$ of the several strips $b$ are bent at right angles, so as to form a continuous flange upon either side of the upper surface of the tables B, as shown in Figs. 5 and 6. The said upturned portions $b^3$ upon each strip are preferably provided with rearwardly-extended ends $b^4$, which overlap the forward portion of the parts $b^3$ of the adjacent strips, the edge or rim formed by such portions $b^3$ thus being made continuous, both when the carrier is moving in a plane and when passing around the sprocket-wheels C'. An overhanging strip, $a'$, may be attached to the side of the housing, as shown in Figs. 4 and 5, the depending edge of which strip is arranged to overlap the upturned ends $b^3$ of the strip $b$, so as to more effectually prevent the passage of the material upon the carriers over the edges thereof, and at the same time to close the joint between the housing and the sides of the carrier, so as to prevent the passage of air through said joints. The said strips $a'$, when used, are preferably continued downwardly at the point where the carrier curves downward in passing around the sprocket-wheels to the point at which the material falls from the surface of the strips composing the carrier, as shown by dotted lines in Fig. 5.

In order to prevent the sagging of the endless-belt carriers or tables B from their own weight or the weight of the material thereon in their intermediate portions between the sprocket-wheels C', additional bearing-rollers $C^2$ are introduced beneath the upper portion of said belts, upon which rollers the chains B' rest. The said rollers $C^2$ are mounted in suitable bearings at their ends in the sides of the housing, and are placed at a distance apart necessary to support the top portion of the carrier substantially in a plane, and so as to retain the upturned ends $b^3$ of the strips $b$ in engagement with the strip $a'$. An additional bearing-roller, $C^3$, may be placed beneath the lower or returning portion of the traveling tables or carriers at the end of the partition A', as shown, so as to prevent the contact of the table with such partition.

In addition to the heating-coils G for warming the air passing through the drier, a series of flat heating-coils, G', are preferably placed in the space inclosed by the endless-belt carriers, as shown in Figs. 1, 3, and 4, whereby the said carriers are kept at a moderate heat and the drying of the material thereon facilitated. The several endless-belt carriers may be moved by any suitable devices connected to the shafts C at one or both ends of the carrier for rotating said shafts. The several shafts are driven at about the same speed, so that the material upon the tables will be carried uniformly through the machine, and the power for operating the tables is preferably applied at the end of each table toward which its upper surface travels, so that such upper surface will be drawn taut, and any slack in the belts will be in its under or returning portion.

As a preferred means of driving the several shafts C in the machine shown, as illustrated in Fig. 2, the shafts C of the upper and lower carriers are extended through the side of the housing and provided with spur-wheels H, and the shaft of the intermediate carrier is extended through the housing at the opposite end of the machine, and has a sprocket-wheel, H', upon its end. A vertical shaft, I, is mounted upon the side of the machine, at one side of the spur-wheels H, and is provided with worms I', constructed to engage the said spur-wheels. Intermediately of the wheels H, upon the side of the housing, is placed a stationary shaft, $h$, which carries a spur-wheel, $H^2$, having the same diameter as the wheels H, and operated by a third worm, $I^2$, upon the shaft I, said worm $I^2$ being pitched in the opposite direction from the worms I' upon the same shaft, so that the wheel $H^2$ is rotated in a direction opposite to the direction of rotation of the wheels H. A sprocket-wheel, $H^3$, is also secured to the shaft $h$, which is made of the same diameter as the sprocket-wheel H' at the opposite end of the machine, a chain-belt, $H^4$, being placed over the said sprocket-wheels, so that the sprocket-wheel H' is rotated by and at the same speed as the sprocket-wheel $H^3$. By the construction described the several belt-carriers are driven at the same speed, and the intermediate one is driven in a direction opposite to the top and bottom ones, and each is driven by the shaft toward which its top surface travels, for the purposes before stated. The shaft I may be driven in any desired or preferred manner, as shown in the drawings. A short horizontal counter-shaft, K, is placed at the top of the machine, and connected to the said shaft I by means of bevel-gears $k$ and $i$, placed upon the said shafts, respectively.

In order to control the exit of material from the feed-hopper D, the lower portion, D', of one side of the inclined bottom of said hopper is hinged at $d$, so that its lower edge is movable, and devices are provided for adjustably holding said hinged portion, so that the space between its lower edge and the opposite stationary part of the hopper may be varied as desired. Such holding device, as shown in Figs. 1, 2, and 3, preferably consists of a transverse shaft, L, mounted at its ends in the side of the housing A, and arranged in a position parallel to and a short distance from the inclined under surface of the said hinged portion D'. The shaft L is provided with one or more eccentrics, L', constructed to bear against said part D', and means are provided for rotating said shaft L. The means for the purpose consist of a spur-wheel, $L^2$, placed upon the end of the said shaft exterior to the housing, and a worm-shaft, $L^3$, mounted in suitable bearings, and provided with a crank by which it may be turned. Bearing-plates $d'$ are preferably attached to the part $D'$, against which the eccentrics $L'$ rest, and a flexible flap, $d^2$, is placed over the joint at the point where the part $D'$ is hinged to the inclined wall of the hopper, in order to prevent the entrance of material into the opening of said joint. Any means of supporting and moving the adjustable portion $D'$ may be used in place of the shaft and eccentrics described, as may be found convenient and desirable.

For the purpose of heating the material placed in the hopper D, previous to the discharge of such material upon the carriers or tables, a coil, or a series of coils, M, of heating-pipe may be placed in said hopper, as shown. In order to prevent the immediate contact of the material in the hopper with the coils M, and to prevent injury or burning of the material by such contact, said coils may be jacketed in any desired manner. An improved means of jacketing said coils is shown in the drawings, in which a layer, $M'$, of coarse wire-netting is placed over each set of coils, and a covering, $M^2$, of thin sheet-iron secured upon the outside of said wire-netting, as shown in Figs. 11 and 12. In case the material in the hopper is inclined to cake, and in order to insure an even and continuous flow of such material downward through the coils and through the exit-orifice, an agitator, N, may be placed in said hopper near the said exit-opening. Such agitator consists, as shown, of a rod having a series of pins or projections upon it, which is vibrated longitudinally by means of an eccentric, $n$, mounted on a rotating shaft, N, placed in bearings attached to the outside of the housing. The agitator N may be provided with a downwardly-projecting and vertical corrugated lip, $n'$, upon its lower edge, to more effectually agitate the material in proximity to the exit-opening. A suitable transverse exit-opening, O, is formed at the bottom of the housing, through which the dried material passes after falling from the end of the lower table. A trough, $O'$, is preferably placed beneath said opening O, which trough is provided with a spiral conveyer, $O^2$, for delivering the material at a point outside of the housing, an outwardly-opening valve (not shown) or other device being arranged at the point of exit, in order to prevent the entrance of cold air in considerable quantities. The drier described may be of any desired or convenient size; but the use of carrier-belts of considerable length—say sixty to seventy feet—is contemplated, in order to expose a large surface of material to the action of the air.

In order to gain access to the interior of the drier, a number of doors or openings, $a'$, may be placed in the walls thereof, as shown, and a platform, as $a^3$, may be arranged for the operator to stand upon in making repairs, as shown in Fig. 1, the incline shown above said platform being hinged or removable, so as to permit access to the adjacent parts of the machine. The heating-chamber F is provided, as shown, with a door, $F'$, by which the admission of cold air to said chamber may be regulated. The said chamber is preferably located in the lower part of the machine; but such chamber may be located at the side thereof, or elsewhere, as is found convenient in constructing the machine.

In Figs. 7 and 8 a modified form of the endless-belt carriers is shown, in which they consist of woven-wire cloth supported upon belts or bands which pass over supporting-rollers at either end of the machine. This construction may be found advantageous in some circumstances, as when the material is of such nature that portions of it will not sift through the meshes of the wire-cloth, as in the use of such wire-cloth the material is exposed to the air both above and below, and will therefore part with its moisture more rapidly than otherwise.

In Fig. 9 is shown a modified form of the drier, in which provision is made for condensing the moisture from the air when it has passed partially through the housing. In such modified form a condensing-chamber, P, is used, which is provided with a series of cold surfaces, (shown in the drawings in the form of coils of pipes Q,) upon which the moisture in said air is condensed as it passes through the chamber. The chamber P is arranged, as shown, to receive the air after it has passed over one of the tables of the series, and to deliver it above the next table by means of a return-passage, R, in which is preferably placed a series of heating-coils, S, by which the air which has been dried and cooled by passing over the coils Q is again heated preparatory to again passing into the drier. The floor of the chamber P is inclined, as shown, and a spout, $p$, is provided for carrying away the water condensed upon the pipes.

Instead of using a stack or flue, E, to create an air-current through the drier, a fan-blower or similar device may be used with the same effect.

In operating upon some kinds of material, as sawdust, it is found desirable to sift it before it is passed through the machine. For this purpose I have placed above the hopper D, as shown in Figs. 10 and 11, a vibrating sieve, T, upon which the material is delivered from a chute, or in any other manner, as desired. Said sieve is preferably inclined in both directions from its center, and over it is placed a double deflector, $T'$, constructed to divide the stream of material falling from the chute, whereby, in connection with the double incline of the sieve, said material is evenly distributed over the sieve and discharged in equal quantities over all portions of the hopper. The means shown for vibrating the sieve T consists of an eccentric, $t$, mounted on a suitable shaft and connected to the frame of the sieve by a pitman, $t'$.

In the operation of the machine constructed as described, the material, which is placed in the feed-hopper, after being heated by the coils therein, is permitted to pass in a continuous stream from the exit-opening of said hopper to the traveling table below and through the current of air passing over said table toward the outlet-flue. The material while in the hopper is heated sufficiently to cause a portion of the moisture therein to take the form of vapor, which is retained in the interstices of the material while it is in bulk in the hopper; but which, when the material falls from the hopper through the air-current, as described, will be taken up by such air-current and removed. The material passing from the hopper to the table, as described, is spread evenly thereon, and the top portion thereof will part with its moisture to the air passing over its surface, while the body of the material will be heated by the pipes beneath the said table, so that still more of the moisture contained therein will be vaporized. Such moisture will be retained in the material until the end of the table is reached, and the material falls therefrom through the heated air-current to the table beneath, by which current the vapor will be again removed. In so falling the material is necessarily thoroughly mixed and new portions exposed to the air upon the second table, while the material adjacent to the surface of such table is again heated and more moisture is expelled, to be carried away by the passage of the air through it in falling to the following table of the series. The same operation is repeated until the material has passed over the bottom table and is delivered therefrom perfectly dry. The number of tables and their length is of course varied in different machines, according to the kind of material to be dried therein, and the amount of heat will be varied in any one machine according to the amount of moisture in the material to be dried and other circumstances.

In the use of a heating-coil in a hopper, as proposed in the drier described, it has been found that in case the material in the hopper is permitted to come in contact with coils heated by live steam there is great liability of injury to the material by overheating it, cases having been known in which the material has taken fire upon continued contact with the pipes. By jacketing the coils, as described, the material is fully protected from such overheating, and the greater part of the heat from the coils is at the same time utilized in drying the material.

I claim as my invention—

1. In a drier, the combination, with a suitable housing, of a series of endless-belt carriers or tables, placed one above another, the alternate tables of the series being oppositely inclined, means for moving the alternate tables in opposite directions, means for heating air introduced into the lower part of the housing, whereby an upward air-current is caused to move over the tables in a direction contrary to that of the moving grain or substance upon the tables, and means constructed to confine said air-current near the surface of the tables, substantially as described.

2. In a drier, the combination, with a suitable housing, of a series of endless-belt carriers or tables, placed one above another, the alternate tables of the series being oppositely inclined, means for moving the alternate tables in opposite directions, means for heating the air introduced at the lower part of the housing, whereby an upward air-current is caused to pass through said housing, and means arranged parallel with the upper surfaces of the tables whereby upwardly-inclined passages are formed for the air-current in passing over said tables, substantially as described.

3. In a drier, the combination, with suitable supporting rollers or pulleys, of an endless-belt carrier or table consisting of two or more flexible belts and transverse metal strips provided with curved flanges upon one of their edges, substantially as described.

4. In a drier, the combination, with sprocket-wheels mounted on suitable shafts, of an endless-belt carrier or table consisting of two or more chain-belts provided with studs or raised cross-bars $b^2$ and metal strips $b$, having curved flanges $b'$, and secured to said studs $b^2$, substantially as described.

5. The combination, with the housing A and with sprocket-wheels C', mounted upon suitable shafts, of the endless-belt carrier or table B, consisting of chain-belts B' and strips $b$, provided with curved flanges $b'$ and upturned ends $b^3$ and strips $a'$ upon the side walls of said housing, substantially as described.

6. In a drier, the combination, with a suitable housing, a series of endless-belt carriers or tables, and means for producing an air-current through said housing, of a feed-hopper provided with a heating-coil, M, substantially as described.

7. In a drier, the combination, with an endless-belt carrier or table, of a feed-hopper provided with a heating-coil, M, and an agitator, N, substantially as described, and for the purpose set forth.

8. In a drier, the combination, with an endless-belt carrier or table, of a feeding-hopper, D, provided with a hinged portion, D', and means for adjusting said hinged portion and holding it in its adjusted position, substantially as and for the purpose set forth.

9. The combination, with the hopper D, having a hinged portion, D', of a shaft, L, provided with eccentrics L', a spur-wheel, $L^2$, and a worm-shaft, $L^3$, for rotating said shaft, substantially as described.

10. The combination, with the several sprocket-wheel shafts C, provided with spur-wheels H, and a sprocket-wheel, H', of the shaft $h$, provided with a spur-wheel, $H^2$, and a sprocket-wheel, $H^3$, a rotating shaft, I, provided with worms I', constructed to engage the spur-wheels H, and a worm, I², constructed to engage the spur-wheel H², and a belt, H⁴, for operating the sprocket-wheel H' from the sprocket-wheel H³, substantially as described.

11. In a drier, the combination, with a suitable housing, with a series of endless-belt carriers or tables placed within said housing, and means for producing an air-current through said housing and over the surfaces of said tables, of means for condensing the moisture from the air at an intermediate point in its passage over the said tables, substantially as described.

12. In a drier, the combination, with a suitable housing, with a series of endless-belt carriers or tables, and with means for producing a current of air over the surface of said tables, of a series of condensing-surfaces for removing the moisture from the air after it has passed over a portion of said tables, and means for heating the air after it has passed over said condensing-surfaces preparatory to its passage over the remainder of the tables, substantially as described.

13. In a drier, the combination, with a suitable housing, with means for producing a current of air through the same, and with a series of endless-belt carriers or tables placed in said housing, of a chamber, P, provided with a series of condensing-coils, Q, and a heating-coil, R, for warming the air after passing through said chamber, substantially as and for the purpose set forth.

14. In a drier, the combination, with a feed-hopper, of a vibrating sieve oppositely inclined from its center, located above said hopper, substantially as and for the purpose set forth.

15. In a drier, the combination, with a feed-hopper, of a sieve located above said hopper, a chute constructed to deliver material to said sieve, and a deflector, T', having a double incline, substantially as and for the purpose set forth.

16. The combination, with the heating-coil of a drier, of a jacket placed around said coil for the purpose of preventing the contact of material therewith, substantially as described.

17. The combination, with a heating-coil, as M, of a jacket consisting of an inner layer of wire-netting and an outer layer of sheet metal, substantially as described.

In testimony that I claim the foregoing as my invention I affix my signature in presence of two witnesses.

THOMAS B. FARRINGTON.

Witnesses:
  C. CLARENCE POOLE,
  JESSE COX, Jr.